United States Patent [19]
Lenards et al.

[11] Patent Number: 4,668,323
[45] Date of Patent: May 26, 1987

[54] METHOD OF MAKING FLEXIBLE, FIBER-COVERED, SHEET-LIKE TEXTILE ARTICLE

[75] Inventors: Gerhard Lenards, Monchen-Gladbach; Karl-Heinz Stukenbrock, Nettetal, both of Fed. Rep. of Germany

[73] Assignees: Uniroyal Englebert Textilcord S.A., Steinfort, Luxembourg; Chemische Fabrik Stockhausen GmbH, Krefeld, Fed. Rep. of Germany

[21] Appl. No.: 702,029

[22] Filed: Feb. 15, 1985

[30] Foreign Application Priority Data

Apr. 17, 1984 [DE] Fed. Rep. of Germany ....... 3414505

[51] Int. Cl.[4] .......................... B32B 5/16; B32B 5/28; B32B 31/20

[52] U.S. Cl. .................................... 156/242; 156/279; 427/180; 427/200; 427/365

[58] Field of Search ......................... 156/242, 279, 72; 427/365, 180, 200

[56] References Cited

U.S. PATENT DOCUMENTS

| | | | |
|---|---|---|---|
| 2,853,413 | 9/1958 | Christian | 156/279 |
| 3,219,507 | 11/1965 | Penman | 156/279 |
| 3,923,938 | 12/1975 | Poppe | 427/180 |
| 4,100,311 | 7/1978 | Nablo et al. | 156/279 |

FOREIGN PATENT DOCUMENTS

| | | | |
|---|---|---|---|
| 1143612 | 3/1983 | Canada | 427/200 |
| 2423284 | 12/1975 | Fed. Rep. of Germany | 156/279 |
| 2542367 | 4/1976 | Fed. Rep. of Germany | 427/200 |
| 159790 | 4/1983 | Fed. Rep. of Germany | 427/200 |
| 48-02712 | 1/1973 | Japan | 427/200 |

*Primary Examiner*—Caleb Weston
*Attorney, Agent, or Firm*—Becker & Becker, Inc.

[57] ABSTRACT

A flocked, sheet-like article which includes adhesive foam and flock. After the flocking, the article is partially dried and calendered. The sheet-like, textile article obtained in this way is light, air permeable, bi-elastic, and has a matted, flannel-like surface. The article can also be embossed.

2 Claims, 1 Drawing Figure

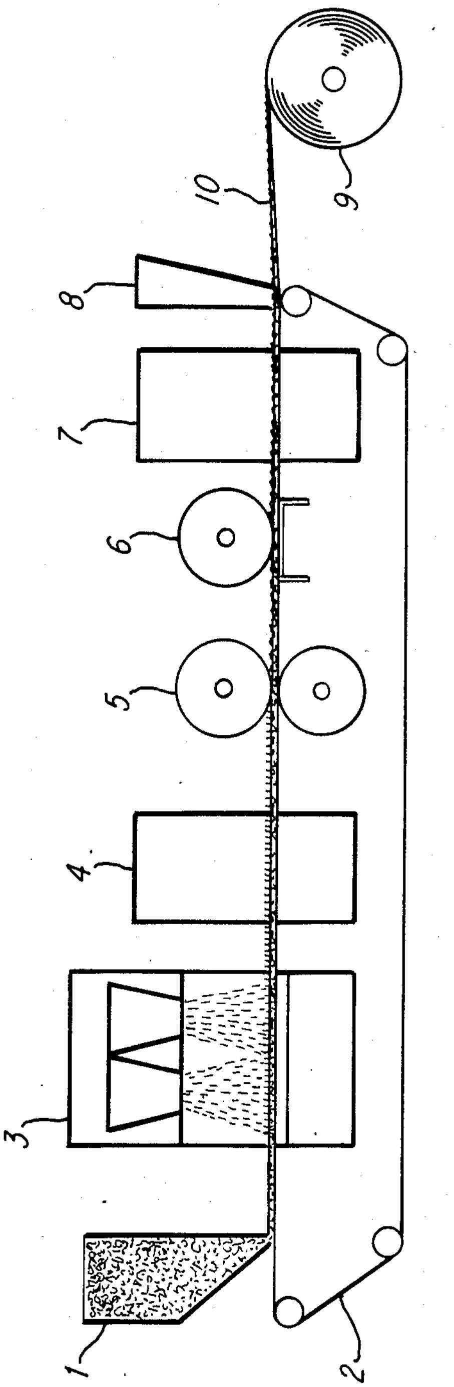
1
2
3
4
5
6
7
8
9
10

METHOD OF MAKING FLEXIBLE, FIBER-COVERED, SHEET-LIKE TEXTILE ARTICLE

BACKGROUND OF THE INVENTION

1. Field of the Invention

The present invention relates to a fiber-cover or flocked, porous, flexible, sheet-like textile article and a method of producing such an article. The article comprises an adhesive layer, and a layer of short fibers (flock). A thin adhesive layer is non-adhesively applied to a carrier surface, and electrostatically treated short fibers are introduced into the adhesive material layer. The sheet-like article which is obtained is dried and fixed or set, whereupon it is cleaned and separated from the carrier surface. As such, the article is a self-supporting textile product which is available for further use.

2. Description of the Prior Art

German Pat. No. 10 81 857 discloses the manufacture of a sheet-like article of adhesive material and short fibers on a carrier surface. Pursuant to this patent, a uniform, continuous film of adhesive material of slightly viscous synthetic material, resin, rubber, or polymer mixture is applied to a carrier surface in the form of a volatile, organic, solvent solution; after being flocked, the film is dried, so that the solvent vaporizes. The sheet-like, textile article which is obtained is light and porous, and exhibits a velvet-like surface. In auxiliary treatment stations, a nap-like surface can also be obtained with the aid of adhesive and a nap layer.

German Pat. No. 832 112 discloses sheet-like, textile articles which comprise a substrate, an adhesive, and short fibers, with a velvet-like surface. Pursuant to this patent, at certain locations the inclination of the fibers is varied by being tilted as a result of being processed with air jets. As a result, lighter and darker effects are achieved in the velvet-like surface.

Pursuant to the handbook "Die textilen Rohstoffe" (the unfinished textile material), E. Wagner, 6th Edition, 1981, page 159, sheet-like, textile articles which are provided with short fibers (flock), are produced as imitations of deer skin, velvet, plush, and fur, as velour paper, as imitation leather, and as other nap products. Serving as a product component which supports the adhesive and the flock is a substrate in the form of cloth, fabric, or paper.

An object of the present invention is to provide a substrate-free, sheet-like, textile article which is provided with a flock layer, has improved wear properties, and furthermore, with regard to its textile surface, has the appearance of an improved flannel-like character.

A object of the present invention is to produce the sheet-like, textile article of standard adhesives and short fibers, and in so doing to simply and economically achieve the desired properties with the aforementioned starting materials and by means of a surface treatment in a further processing stage.

BRIEF DESCRIPTION OF THE DRAWING

These objects, and other objects and advantages of the present invention, will appear more clearly from the following specification in conjunction with the accompanying drawing, which schematically illustrates one exemplary arrangement for practicing the inventive method, for example to produce a flocked, sheet-like, textile article which has a flannel-like appearance.

SUMMARY OF THE INVENTION

The present invention is characterized primarily in that the sheet-like article, which is obtained from an aqueous, polymeric, foamed or expanded adhesive dispersion and short fibers (flock), is additionally calendered subsequent to the flocking.

An aqueous adhesive dispersion in air-foamed form, which is continuously applied to a carrier surface as a thin layer, is flocked with short fibers in the flocking or fiber-covering stage, and, as a partially dried and not yet hardened sheet-like, textile article which is combined with a dense flock layer of essentially upright fibers, is moved through the roller gap of a calender, where it is compressed to a specific desired thickness. A uniform shaping of the surface of the flock is essentially achieved.

The calendered sheet-like article is subsequently fixed or set and dried, i.e. condensed-out, the excess flock is then cleaned off, and the article is removed from the carrier surface. The textile, sheet-like product obtained in this manner is light, is permeable to air, and is bi-elastic. It has a surface which is equivalent to fine flannel. This improved appearance is achieved by the calendering.

Furthermore, the inventive article has a soft feel, and appears thicker than it really is. It can also withstand cleaning. Due to these properties, the sheet-like, textile article can be advantageously used in may fields, for example as a liner in purses, handbags, and suitcases, as a replacement for textile wall coverings in rooms, and as an interior covering in vehicles. As a less decorative material it can be used as sound-refracting material in vehicles and machine housings, such as typewriters and other office equipment, or vacuum cleaners. When used in rooms, it can be thermally insulating and sound absorbing.

Adhesive dispersions are known from the synthetic material handbook, polyurethane, volume 7, G. Ortel, Second Edition, 1983; for example, see page 591 for adhesive material of aqueous polyurethane dispersions. See also section 11.7.4, lining or covering industry, especially composite material having cloth and fabric, such as for flocking the entire surface, and section 11.7.5, vehicle industry, especially vehicle parts, for example glove compartments, with regard to decorative flocking.

Pursuant to the manufacturing process of the present invention, the adhesive dispersion is combined with the flock layer in such a way that the short fibers which enter the adhesive hold and reinforce the adhesive layer, and that they are themselves supported by the densely present short fibers, which are essentially upright. The short fibers of the flocked region, and the large-celled foamed component, which in its adhesive layer portion is still plastic, not condensed out, and not finally polymerized, are compressed in the roller gap of the calender, whereby the flocked surface essentially receives its very uniform surface shape, which extends over the entire surface. This shaping then bestows a flannel-like, uniform/nonuniform appearance.

After the drying and setting, this calendered, sheet-like article forms a very light sheet of material which is very air permeable and is bi-elastic to a certain extent, and which has a blocked surface of the type previously described.

Pursuant to a further embodiment, after the calendering the sheet-like, textile article can, in an embossing stage, preferably receive a decorative pattern using prescribed, selectively used embossing aids. For example, the article can receive a rustic design in the material. The treatment in the calendering and embossing stages results in a sheet-like, textile article which has a combined character similar to plain fabric and flannel.

The following examples will explain in detail the inventive method and the sheet-like, textile product which is obtained therefrom.

DESCRIPTION OF PREFERRED EMBODIMENTS

Referring now to the drawing in detail, an aqueous polymeric foamed or expanded adhesive dispersion having a foam material weight of 100 to 500 g/l of polyurethane or acrylic resin is, via a backfilling and doctor blade arrangement 1, applied in a thickness of the air foam of selectively 100 to 1000 μm onto a carrier surface 2 which is in the form of a non-adhesive and heat-resistant endless band. In a flocking or fiber-covering stage 3, i.e. an electrostatic field, electrostatically treated short fibers of a known type, for example polyamide fibers having a size of selectively 1.7 to 3.3 dtex, and a cut length of selectively approximately 0.6 to 1.0 mm, are introduced or flocked into the adhesive layer, so that the ends of the short fibers are at least partially surrounded by the adhesive material. The adhesive layer is relatively large-celled, and is very thin. The adhesive foam material bonds with the densely applied short fibers, with the fibers and the foam material holding one another, and the fibers to a certain extent reinforcing the adhesive material. The doctoring and the flocking take place at room temperature. The flocked sheet, as it leaves the flocking stage 3, is soft, plastic and visco-elastic, and not yet hardened. Depending upon the type of foamed adhesive which is selected, the flocked sheet is then dried in a first drying zone 4 either by heat treatment or thermal treatment, whereby the water is removed from the adhesive foam.

The flocked sheet is then guided through the roller gap of a calender 5, where it is subjected to contact pressure, by means of which the short fibers are subjected to pressure and/or lateral flexure. The result is that the surface of the sheet displays a uniform flannel-like appearance, or matted flannel-like appearance. This appearance is uniform over the entire surface, and constitutes a novel refinement which, by way of comparison, can only be achieved with cloth or fabric with expensive equipment.

Before the foamed adhesive condenses out, further surface treatments can be undertaken in an intermediate stage 6. For example, an embossing or sculpturing, or partial embossing, can be provided. This depends, of course, upon the requirements for the later application of the sheet-like, textile article. Examples of fields of application include the vehicle industry, and divisions which deal with wall covering material, and bag material.

In a further processing stage 7, the partially dried, surface treated, textile, sheet-like article is subjected to a drying and fixing or setting process, with the top and bottom sides possibly being subjected to different thermal treatments. In this process, the sheet-like article receives the desired structural stability and the required quality. Subsequent to this last treatment stage, excess residual material is removed from the sheet-like, textile article, for example by means of a suction apparatus 8. The sheet-like article is then separated from the carrier surface 2, and is wound-up into a roll. The overall processing time is approximately 5 to 6 minutes. The wound-up sheet-like article is relatively soft and elastic, has a thick feel, and has a weight of about 120 to 150 g/m$^2$. The roll is designated with the reference numeral 9, and the flocked, substrate-free, sheet-like, textile article is designated with the reference numeral 10.

The sheet-like, textile article obtained pursuant to the method of the present invention comprises (a) the adhesive foam of the aforementioned aqueous dispersion, which is mechanically air-foamed and has a good inherent stability and at the same time a good permeability to air due to its large-celled structure, and (b) the flock or short fiber layer of standard flock construction.

This substrate-free, sheet-like article is self-supporting, with the short fibers being better anchored in the adhesive, in particular due to the calendering, and with the fibers reinforcing the adhesive. The density of the flock in production promotes this connection or bond. The condensed-out thickness of the adhesive foam can be between 0.1 and 1 mm, depending upon the field of application for which it is to be provided.

A high breathing activity and permeability of the article to air is achieved. The high air activity allows the light sheet-like article to absorb moisture in conformity to its weight. The overall appearance of the article makes it look heavier than it actually is. The bi-elasticity which is achieved makes it possible for the article to "dish" up to 25%.

As previously mentioned, the inventive article can be used in the vehicle industry. For example, during production of the so-called automobile roof, the article is adhesively applied to the support structure, for example sheet metal or plastic, prior to the deformation or shaping of the latter, and is then shaped and stamped together with the support structure. This results in many advantages.

No condensation forms on the roof; the latter is insulated relative to noise and temperature. The roof is stylishly lined in the desired color, does not discolor, does not fade, and is easy to clean. With the use of the inventive sheet-like, textile article, the inside of automobile doors, compartments, and floors can also be economically equipped in a stylish design with this article. The advantages are the same as for the roof of the car. The housings or casings of typewriters and other office equipment can be provided with this textile article as a sound-absorbing element. The transfer of noise is considerably reduced in this manner.

Furthermore, purses, handbags, and suitcases, to name just a few, can be conveniently lined or covered in any desired design with the inventive textile article, which is easy to clean and is resistant to wear.

The inventive, sheet-like, textile article is furthermore advantageously suitable for interior decoration as an economical fabric or material for rooms in conference halls, concert halls, theaters, etc. It is sound-refracting, and somewhat sound-reflecting. It can readily replace expensive textile material. The colors and patterns can be produced as desired. At the same time, the aforementioned flannel-like surface appearance can also be easily produced in embossed form.

The present invention is, of course, in no way restricted to the specific disclosure of the specification and drawing, but also encompasses any modifications within the scope of the appended claims.

What we claim is:

1. A method of producing a flexible, fiber-cover or flocked, porous, sheet-like textile article which includes an adhesive layer and a short fiber layer; said method including the steps of applying a thin adhesive layer in a non-sticking manner onto a carrier surface, flocking said adhesive layer by introducing electrostatically treated short fibers therein, drying and setting the thus obtained sheet-like article, and subsequently cleaning said article and separating it from said carrier surface;

the improvement therewith comprising the steps of:

providing as said adhesive layer an aqueous, polymeric, air-foamed adheive dispersion; and, subsequent to said flocking, calendering said sheet-like article and thereby shifting the flock into a bent-over lying-down configuration therewith for a uniformly fine flannel-like appearance thereof; and partially drying said sheet-like article after said flocking step and prior to said calendering step.

2. A method according to claim 1, which includes the steps of carrying out said calendering prior to said drying and setting step, and embossing the surface of said sheet-like article after said calendering step and prior to said drying and setting step.

* * * * *